United States Patent
Hamedany et al.

(10) Patent No.: US 9,066,141 B2
(45) Date of Patent: Jun. 23, 2015

(54) RESOURCE ALLOCATION AND MODIFICATION USING STATISTICAL ANALYSIS

(75) Inventors: Allen Hamedany, Westford, MA (US);
Michael Warres, Cambridge, MA (US);
Muriel Medard, Belmont, MA (US);
Louis M. Colon, Jr., Bolton, MA (US);
Chris Losso, Marlborough, MA (US);
Jim Hurley, Boxborough, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 838 days.

(21) Appl. No.: 12/691,066

(22) Filed: Jan. 21, 2010

(65) Prior Publication Data

US 2010/0185768 A1   Jul. 22, 2010

Related U.S. Application Data

(60) Provisional application No. 61/146,176, filed on Jan. 21, 2009.

(51) Int. Cl.
*G06F 15/173* (2006.01)
*H04N 21/472* (2011.01)
*H04N 21/231* (2011.01)
*H04N 21/262* (2011.01)
*H04N 21/61* (2011.01)

(52) U.S. Cl.
CPC ... *H04N 21/47202* (2013.01); *H04N 21/23116* (2013.01); *H04N 21/26208* (2013.01); *H04N 21/6125* (2013.01)

(58) Field of Classification Search
CPC .......... H04N 21/47202; H04N 21/26208; H04N 21/6125; H04N 21/23116
USPC .............. 709/226, 221, 223; 718/104
See application file for complete search history.

(56) References Cited

U.S. PATENT DOCUMENTS

| 3,746,780 A | 7/1973 | Stetten et al. |
| 3,851,104 A | 11/1974 | Willard et al. |
| 4,845,658 A | 7/1989 | Gifford |
| 5,132,992 A | 7/1992 | Yurt et al. |
| 5,581,552 A | 12/1996 | Civanlar et al. |

(Continued)

FOREIGN PATENT DOCUMENTS

| WO | WO 2008/137334 | 11/2008 |
| WO | WO 2010/006127 | 1/2010 |

(Continued)

OTHER PUBLICATIONS

Amazon S3; Developer Guide (API Version Mar. 1, 2006); Amazon Web Services; http://www.amazon.com/gp/browse.html?node=16427261; Mar. 1, 2006.

(Continued)

*Primary Examiner* — Thuong Nguyen
(74) *Attorney, Agent, or Firm* — Harrity & Harrity, LLP

(57) ABSTRACT

In one aspect, a computer-implemented method includes generating a workload using at least one schema defined by combinations of ranges of each of at least two attributes. The computer-implemented method also includes receiving a request to provide content. The computer-implemented method further includes provisioning the content based upon the workload.

22 Claims, 13 Drawing Sheets

(56) References Cited

U.S. PATENT DOCUMENTS

| | | | |
|---|---|---|---|
| 5,581,784 A | 12/1996 | Tobagi et al. | |
| 5,583,995 A | 12/1996 | Gardner et al. | |
| 5,608,448 A | 3/1997 | Smoral et al. | |
| 5,640,563 A | 6/1997 | Carmon | |
| 5,787,482 A | 7/1998 | Chen et al. | |
| 5,805,804 A | 9/1998 | Laursen et al. | |
| 5,862,312 A | 1/1999 | Mann et al. | |
| 5,926,649 A | 7/1999 | Ma et al. | |
| 6,230,200 B1 | 5/2001 | Forecast et al. | |
| 6,374,336 B1 | 4/2002 | Peters et al. | |
| 6,401,126 B1 | 6/2002 | Douceur et al. | |
| 6,609,149 B1 | 8/2003 | Bandera et al. | |
| 6,996,517 B1* | 2/2006 | Papaefstathiou | 703/22 |
| 7,058,947 B1 | 6/2006 | Raja et al. | |
| 7,277,978 B2 | 10/2007 | Khatami et al. | |
| 2001/0033557 A1* | 10/2001 | Amalfitano | 370/335 |
| 2002/0147770 A1* | 10/2002 | Tang | 709/203 |
| 2003/0005457 A1 | 1/2003 | Faibish et al. | |
| 2003/0033308 A1* | 2/2003 | Patel et al. | 707/10 |
| 2003/0140051 A1 | 7/2003 | Fujiwara et al. | |
| 2003/0195948 A1 | 10/2003 | Takao et al. | |
| 2004/0103437 A1* | 5/2004 | Allegrezza et al. | 725/95 |
| 2004/0198386 A1 | 10/2004 | Dupray | |
| 2005/0181803 A1 | 8/2005 | Weaver et al. | |
| 2005/0262246 A1 | 11/2005 | Menon et al. | |
| 2006/0062555 A1 | 3/2006 | Zimmermann et al. | |
| 2006/0083205 A1* | 4/2006 | Buddhikot et al. | 370/338 |
| 2006/0087990 A1 | 4/2006 | Kakivaya et al. | |
| 2006/0168166 A1* | 7/2006 | Hardwick et al. | 709/221 |
| 2006/0190552 A1 | 8/2006 | Henze et al. | |
| 2006/0259662 A1 | 11/2006 | Furukawa et al. | |
| 2006/0272015 A1 | 11/2006 | Frank et al. | |
| 2008/0109580 A1 | 5/2008 | Carlson et al. | |
| 2008/0244033 A1 | 10/2008 | Hook et al. | |
| 2008/0273540 A1 | 11/2008 | Gerovac et al. | |
| 2009/0222467 A1* | 9/2009 | Kalia et al. | 707/100 |
| 2010/0004993 A1* | 1/2010 | Troy et al. | 705/14.51 |
| 2010/0010999 A1 | 1/2010 | Gerovac et al. | |
| 2010/0011002 A1 | 1/2010 | Gerovac et al. | |
| 2010/0011003 A1 | 1/2010 | Carver et al. | |
| 2010/0011091 A1 | 1/2010 | Carver et al. | |
| 2010/0011096 A1 | 1/2010 | Gerovac et al. | |
| 2010/0011145 A1 | 1/2010 | Carver et al. | |
| 2010/0011364 A1 | 1/2010 | Gerovac et al. | |
| 2010/0011365 A1* | 1/2010 | Gerovac et al. | 718/104 |
| 2010/0083145 A1* | 4/2010 | Schang et al. | 715/760 |
| 2013/0268482 A1* | 10/2013 | Govani et al. | 707/609 |

FOREIGN PATENT DOCUMENTS

| | | |
|---|---|---|
| WO | WO 2010/006132 | 1/2010 |
| WO | WO 2010/006134 | 1/2010 |

OTHER PUBLICATIONS

Androutsellis-Theotokis et al; "A Survey of Peer-to-Peer Content Distribution Technologies;" AMC Computing Surveys, vol. 36, No. 4; Dec. 3004; pp. 335-371.

Braam; File Systems for Clusters from a Protocol Perspective; 2nd Extreme Linux Topics Workshop; Jun. 1999; 5 sheets.

Chen et al.; "RAID: High-Performance, Reliable Secondary Storage;" AMC Computing Surveys, vol. 26, No. 2; DOI=http://doi.acm.org/10.1145/176979.176981; Jun. 1994; pp. 145-185.

Gal: "Algorithms and Data Structures for Flash Memories;" ACM Computing Surveys, vol. 37, No. 2; DOI=http://doi.acm.org/10.1145/1089733.1089735; Jun. 2005; pp. 138-163.

Ghandeharizadeh et al; "Continuous Display of Video Objects Using Multi-Zone Disks;" USC-CSE-94592; Apr. 12, 1995; 28 sheets.

Goel et al.; SCADDAR: An Efficient Randomized Technique to Reorganize Continuous Media Blocks; 18th Int'l Conf on Data Engineering (ICDE 2002); Feb. 26-Mar. 1, 2002; 10 sheets.

Griwodz et al.; Long-term Movie Popularity Models in Video-on-Demand Systems or The Life on an on-Demand Movie; 5th ACM Int'l Conf. on Multimedia; DOI=http://doi/acm/org/10.1145/266180-266386; Nov. 9-13, 1997; pp. 349-357.

Hartman et al.; "The Zebra Striped Network File System;" ACM Trans. Comput. System, vol. 13, No. 3; DOI =http://doi.acm.org/10.1145/210126.210131; Aug. 3, 1995; pp. 274-310.

Liskov et al.; "Providing Persistent Objects in Distributed Systems;" 13th European Conference on Object-Oriented Programming; Ed. Lecture Notes in Computer Science, vol. 1628; Jun. 14-18, 1999; pp. 230-257.

Liskov et al.; "Transactional File System Can Be Fast;" 11th Workshop an ACM SIGOPS European Workshop: Beyond the PC; DOI=http://doi.acm.org.10.1145/1133272.1133592; Sep. 19-22, 2004; pp. 1-6.

Little et al.; "Popularity-Based Assignment of Movies to Storage Devices in a Video-on-Demand System;" Multimedia Systems, vol. 2, No. 6; Jan. 1995; pp. 280-287.

Liu et al.; "Scheduling Algorithms for Multiprogramming in a Hard-Read-Time Environment;" Journal of the Association for Computing Machinery, vol. 20, No. 1; DOI=http://doi.acm.org/10.1145/321738.321743; Jan. 1973; pp. 46-61.

Long et al; "Swift/RAID: A Distributed RAID System;" Comput. Syst. 7, 3; Jun. 1994; pp. 333-359.

Mourad; "Issues in the design of a storage server for video-on-demand;" Multimedia Systems; vol. 4, No. 2; Apr. 1, 1996; XP008040912; pp. 70-86.

"NAND Flash Memories and Programming NAND Flash Memories Using ELNEC Device Programmers Application Note Version 2.01;" Sep. 2006, pp. 1-31.

Oney; "Queueing Analysis of the Scan Policy for Moving-Head Disks;" Journal of the Association for Computing Machinery, vol. 22, No. 3; DPI=doi.acm.org/10.1145/321892.987902; Jul. 1975; pp. 397-412.

Patterson et al.; "A case for Redundant Arrays of Inexpensive Disks (RAID); 1988 AC SIGMOD Int'l Conference on Management of Data;" DOI=http;//doi.acm.org.10.1145/50202.50214; Jun. 1-3, 1988; pp. 109-116.

Pinheiro et al; "Failure Trends in a Large Disk Drive Population;" FAST '07: 5th USENIX Conference on File and Storage Techniques; Feb. 13-16, 2007; pp. 17-28.

Reddy et al.; "I/O Issues in a Multimedia System;" DOI=ex.doi.org. 10.1109/2.268888; Mar. 1994; pp. 69-74.

Ruemmler et al.; "An Introduction to Disk Drive Modeling;" DOI=http://dx.doi.org/10.1109/2.268881; Mar. 1994; pp. 17-28.

Samsung Memory Division; NAND Flash ECC Algorithm 256B; Jun. 24, 2004; 8 sheets.

Samsung Memory Division; ECC Algorithm; 512B; Apr. 28, 2005; 8 sheets.

Samsung Memory Division; NAND Flash Spare Area Assignment Standard; Apr. 27, 2005; 5 sheets.

Schindler et al; "Automated Disk Drive Characterization;" Technical Report CMU-CS-99-176; Carnegie Mellon University; Dec. 1999; 21 sheets.

Schroeder et al.; "Disk Failures in the Real World; What Does an MTTF of 1,000,000 Hours Mean to You?;" FAST '05: 5th USENIX Conference on File and Storage Technologies; FAST '07; 2007; Feb. 14, 2007; pp. 1-16.

Sha et al.; "A Systematic Approach to Designing Distributed Real-Time Systems;" Computer vol. 26, No. 9; DOI=http://dx.doi.org/10.1109/2.231276; Sep. 1993; pp. 67-78.

Shahabi et al; "Yima: A Second-Generation Continuous Media Server;" IEEE Computer Magazine, Jun. 2002; pp. 56-64.

Shenoy; "Cello: A Disk Scheduling Framework for Next Generation Operating Systems;" Real-Time Syst. 22; 1-2; Jan. 2002; pp. 1-22.

Sinha et al.; "Intelligent Architectures for Managing Content;" Communications Technology Magazine; May 1, 2003; pp. 1-3.

Stoller et al; "Storage Replication and Layout in Vidio-on-Demand Servers;" 5th Int'l Workshop on Network and Operating System Support for Digital Audio and Video; Apr. 19-21, 1995; Eds. Lecture Notes in Computer Science, vol. 1018; pp. 330-341.

Stonebraker et al.; "Distributed RAID-A New Multiple Copy Algorithm;" 6th Int'l Conference on Data Engineering; IEEE Computer Society; Feb. 5-9, 1990; pp. 430-437.

(56) References Cited

OTHER PUBLICATIONS

Talagala et al; "2000 Microbenchmark-based Extraction of Local and Global Disk Characteristics;" UMI Order No. CSD-99-1063; University of California at Berkley; pp. 26.
Teorey et al.; "A Comparative Analysis of Disk Scheduling Policies;" Communications of the ACM, vol. 15, No. 3; DOI=doi.acm.org/10.1145/361268/361278; Mar. 1972; pp. 177-184.
Tetzlaff; "Elements of Scalable Video Servers;" 40th IEEE Computer Society Int'l Converence; COMPCON; Mar. 5-9, 1995; pp. 239-248.
Thouin et al.; "Video-on-Demand Networks; Design Approaches and Future Challenges;" IEEE Network-Special Issue on Convergence of Internet and Broadcasting Systems, vol. 22, No. 2; Mar. 2007; pp. 42-48.
To et al.; "Strategic Selection and Replication of Movies by Trend-Calibrated Movie-Demand Model;" 2000 Int'l Conference on Microelectronic Systems Education; MSE; Nov. 13, 2000; pp. 97-100.
Venugopal et al.; "A Taxonomy of Data Grids for Distributed Data Sharing, Management, and Processing;" AMC Computing Surveys, vol. 38, Mar. 2006; Article 3, pp. 1-53.
Worthington et al.; "Scheduling for Modern Disk Drives and Non-Random Workloads;" University of Michigan, Technical Report CSE-TR-194-94, Mar. 1, 1994; pp. 51 sheets.
Worthington et al; "On-Line Extraction of SCSI Disk Drive Parameters;" University of Michigan; Technical Report CSE-TR-323-96; Dec. 19, 1996; 46 sheets.
Zimmerman; "Continuous Media Placement and Scheduling in Heterogeneous Disk Storage Systems;" Technical Report, USC-99-699; pp. 1-100.
Medard et al.; "Arrangements and Methods for Access to Stored Data;" U.S. Appl. No. 12/827,154, filed on Jun. 30, 2010.
Office Action dated May 7, 2010 for U.S. Appl. No. 12/170,769.
Restriction Requirement dated Jul. 9, 2010 for U.S. Appl. No. 12/170,787.
Restriction Requirement dated Jun. 10, 2010 from U.S. Appl. No. 12/170,624.
PCT Search Report of the ISA for PCT/US2008/061401 dated Jul. 1, 2008.
PCT Written Opinion of the ISA for PCT/US2008/061401 dated Jul. 1, 2008.
PCT International Preliminary Report on Patentability of the ISA for PCT/US2008/061401 dated Nov. 19, 2009.
PCT Search Report of the ISA for PCT/US2009/050051 dated Sep. 7, 2009.
PCT Written Opinion of the ISA for PCT/US2009/050051 dated Sep. 7, 2009.
PCT Partial International Search report of the ISA for PCT/US2009/050057 dated Oct. 26, 2009.
PCT Search Report of the ISA for PCT/US2009/050057 dated Jan. 14, 2010.
PCT Written Opinion of the ISA for PCT/US2009/050057 dated Jan. 14, 2010.

\* cited by examiner

*Re-modeling*

RESOURCE ALLOCATION AND MODIFICATION USING STATISTICAL ANALYSIS

RELATED APPLICATIONS

This application claims priority to provisional application Ser. No. 61/146,176, entitled "RESOURCE ALLOCATION AND MODIFICATION USING STATISTICAL ANALYSIS," filed Jan. 21, 2009, which is incorporated herein in its entirety.

BACKGROUND

Distributed network-based data storage, for example accessible over the Internet, has various applications. One application is video storage and access.

During the past decade, online video streaming has gained increasing popularity among Internet users as high speed Internet service is now readily available for households. For example, while traditional video delivery systems (e.g., cable television systems) may no longer satisfy customers' growing demand for convenient access and instant delivery, movie consumers may soon turn to online video stores that can provide such service.

However, providing reliable download services to consumers on a large scale at an affordable cost presents many challenges. For example, configuring a network-based video storage and delivery system may encounter dynamic distributed real-time resource allocation issues that can be characterized as an NP complete problem. Conventional approaches for solving NP complete problems attempt to restrict the problem in some manners to conduct an exhaustive search for a deterministic solution. These procedures are often computationally expensive, yet may still produce undesirable results.

SUMMARY

In one aspect, a computer-implemented method includes generating a model workload using at least one schema defined by combinations of ranges of each of at least two attributes. The computer-implemented method also includes receiving a request to provide content. The computer-implemented method further includes provisioning the content based upon the model workload.

In another aspect, a set of platforms includes hardware elements. The set of platforms are configured to generate a workload using at least one schema defined by combinations of ranges of each of at least two attributes, receive a request to provide content and provision the content based upon the workload. The at least two attributes are selected from: popularity, resiliency, integrity, geographical affinity and exclusion, topological affinity and exclusion and power consumption.

One or more of the aspects above may include one or more of the following features. Each of the at least one schema may correspond to a maximum bandwidth to access the content. The computer-implemented method may also include determining whether a re-provisioning condition is satisfied based upon obtained information and the determining includes forming a statistical representation of actual usage of a first item of the content using at least one set of usage data and comparing the statistical representation of the actual usage with a usage threshold associated with the first resource allocation arrangement; and generating a specification of a re-provisioning operation if the re-provisioning condition is satisfied. Provisioning the content based upon the workload may include provisioning the content from a group of platforms. Provisioning the content from a group of platforms may include receiving at a first platform the request to provide the content and transferring the content from a second platform to the first platform. The computer-implemented method may also include generating a model workload based upon empirical data and generating the prescriptive workload using the model workload. Generating a model workload based upon empirical data may include generating a model workload based upon empirical data that includes at least one of geographical profile of viewing habits of consumers and a statistical usage distribution characterizing a number of views over a specified period of time. Generating a workload using at least one schema may include generating a workload using at least one schema that includes at least one of title rank, disk span, disk region, number of primary copies of the content and bandwidth.

In a further aspect, a computer-implemented method includes obtaining information characterizing a level of actual usage of a first item of content that includes collecting successive sets of usage data over a sequence of time windows. Each set corresponds to a respective time window. The first item of content is stored on a first set of elements of resources of a storage environment according to a first resource allocation arrangement. The computer-implemented method also includes based upon the obtained information, determining whether a re-provisioning condition is satisfied that includes forming a statistical representation of the actual usage of the first item of content using at least one set of usage data and comparing the statistical representation of the actual usage with a usage threshold associated with the first resource allocation arrangement. The computer-implemented method further includes upon satisfaction of the re-provisioning condition, generating a specification of a re-provisioning operation to be executed in association with the resources of the storage environment.

DETAILED DESCRIPTION

In a distributed system, there can be a library of content characterized by a broad range of attributes (e.g., data type, length, popularity and access patterns) and operational objectives (e.g., performance, integrity, and resilience), such that each piece of content may involve the use of system resources on different levels. For example, content of higher popularity (e.g., content which is accessed more frequently compared to a frequency with which other content is accessed) may generally need more access resources (e.g., readout bandwidth) to enhance streaming performance of the system with respect to the content having higher popularity; content of greater importance, on the other hand, may need more storage space (e.g., to store redundancy data) to ensure data integrity.

Managing a finite amount of system resources in a way that can well serve the operational objectives of content usage can be a complex problem. Moreover, the level of difficulty can grow progressively as the system increases in size. In some systems, it is advantageous to apply domain-specific knowledge in managing system resources (such as storage and access resources) across multiple dimensions. This approach is illustrated in the context of a distributed system for data storage and access described in co-pending U.S. patent application Ser. No. 12/170,657, titled "Distributed Data Storage and Access Systems," filed Jul. 10, 2008, assigned to the assignee of the present application and the disclosure of which is incorporated herein by reference in its entirety.

Figure 1A:
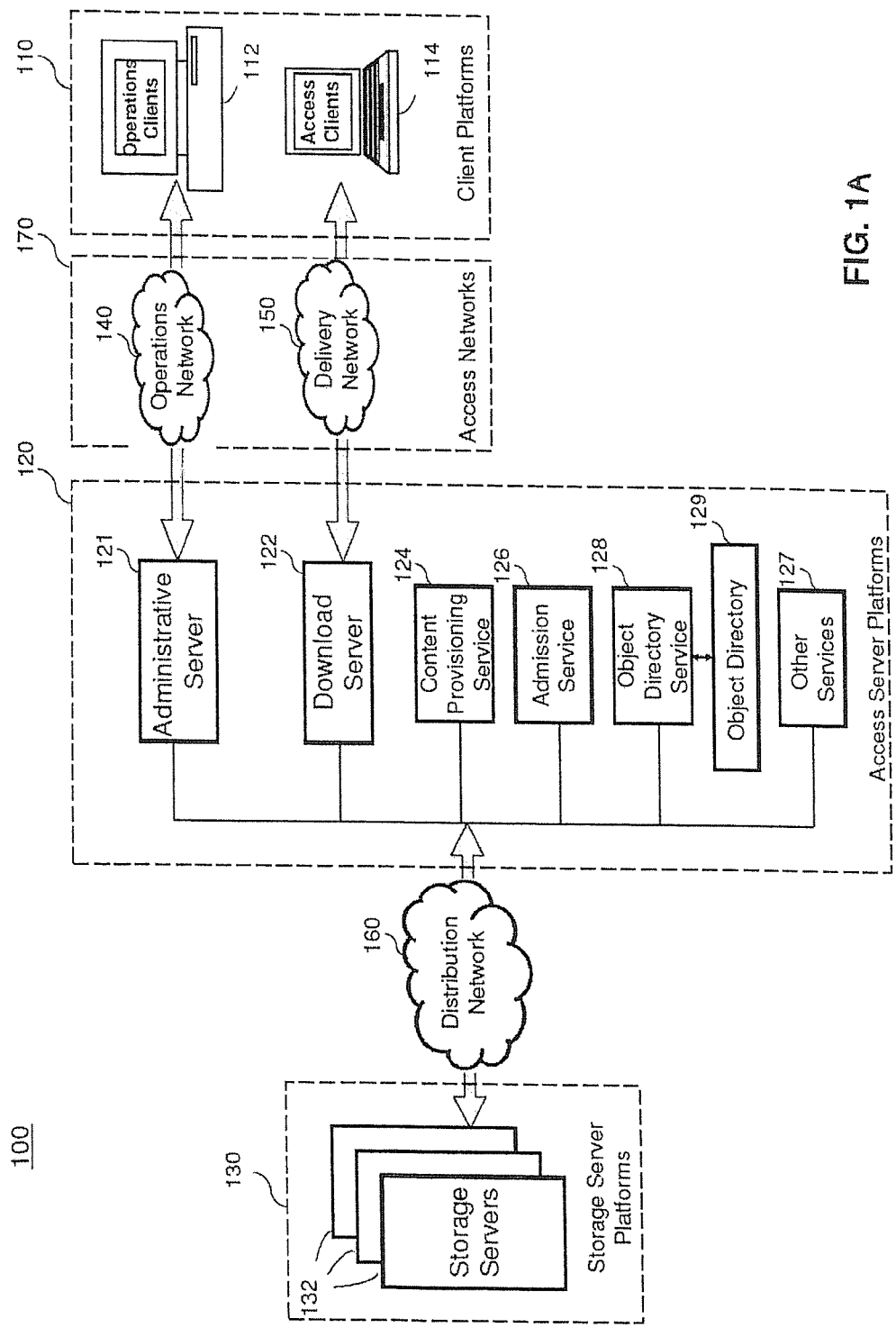
FIG. 1A is a block diagram of an exemplary distributed system for data storage and access.

Referring to FIG. 1A, briefly, a distributed system 100 includes three basic types of computing platforms for content storage and delivery: storage server platforms 130, access server platforms 120, and client platforms 110. The term "platform" is used to refer to a collection of components, which may, for example, be hosted on a single computer, or distributed over multiple computers.

The storage server platforms 130 host one or more storage servers 132. Each storage server 132 contains storage and provides the capability to read and write data. For example, each storage server 132 may be hosted on one computer, or its function may itself be distributed on multiple hardware elements.

The access server platforms 120 provide access services that collectively provide applications with one or more methods of accessing data/content with respect to storage servers of the system. Some access services handle data according to a prescribed access protocol/regime/interface (e.g., HTTP, RTSP, NFS and so forth). Other access services manage resources of the system and regulate access to content accordingly. Services that manage resources of the system include for example, a content provisioning service 124, which allocates resources of the system to store and deliver content, and an admission service 126, which admits sessions when called upon by various session requests in the system.

In general, the access server platforms 120 are interconnected on one side with the storage server platforms 130 by a distribution network 160, and on the other side with the client platforms 110 by an access network 170. The access network 170 allows various types of clients to communicate with the access server platforms 120 via one or multiple channels. For example, operations client 112 (e.g., administrators of online video stores) may communicate with an administrative server 121 via an operations network 140, while access clients 114 (e.g., customers of online video stores) may communicate with a download server 122 via a delivery network 150. Both administrative and download servers 121 and 122 may interact with the rest of the system to handle various client requests such as uploading and downloading content.

It should be appreciated that one platform may be connected to another platform through a network that may be widely distributed. Content may be relayed from one platform to another through service client requests.

Figure 1B:
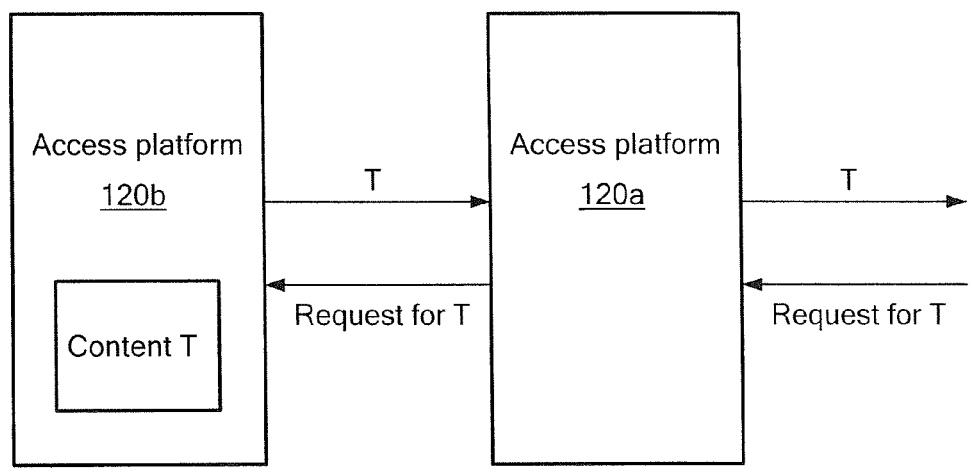
FIG. 1B is an example of relaying content using access service platforms.

Referring to FIG. 1B, in one example, one access server platform 120a may be connected to another access server platform 120b through a network that may be widely distributed. In another example, content may be relayed from one access server platform 120b to another access server platform 120a to service client requests. In particular, a request is made to the access server platform 120a for content, T. The content T is not available on the access server platform 120a but the content T is available on the access server platform 120b. In this example, the access server platform 120a requests the contact content T from the access server platform 120b and the content T is relayed from the access server platform 120b to the access server platform 120a to service the request. In other examples, content may be relayed between other platforms, for example, between storage server platforms 130 and/or between storage server platforms 130 and access server platforms 120.

Referring back to FIG. 1A, in uploading content to the storage, the content provisioning service 124 determines how to arrange data across available storage resources in a manner which satisfies operational objectives of the content. Examples of operational objectives include but are not limited to: performance objectives (such as accessibility), integrity, resilience, and power consumption, each of which can be characterized by one or multiple attributes. For instance, a popularity attribute associated with a viewing frequency of a particular title can represent a desired level of content accessibility—one type of operational objective that the system may intend to serve.

The process of making provisioning decisions that take into account the objectives of each individual in the system can represent an NP Complete problem, which is particularly complex for large systems. One approach to solving this problem involves applying domain knowledge to organize the problem space and to form partial solutions (e.g., models) that can guide the search for optimal solutions in a more efficient manner For example, a pattern of access to titles of a library can be used to establish a model workload. In one exemplary embodiment, the model workload contains a finite set of categories that are each mapped to a partially determined allocation scheme that represents a way of resource arrangement. Using the model workload, content provisioning can be then approached as a two-step process—firstly, attribution of each piece of content to a proper category, and secondly, resource allocation within the local scheme of that category. Model-based content provisioning will be described in greater detail in the following sections.

Figure 2:
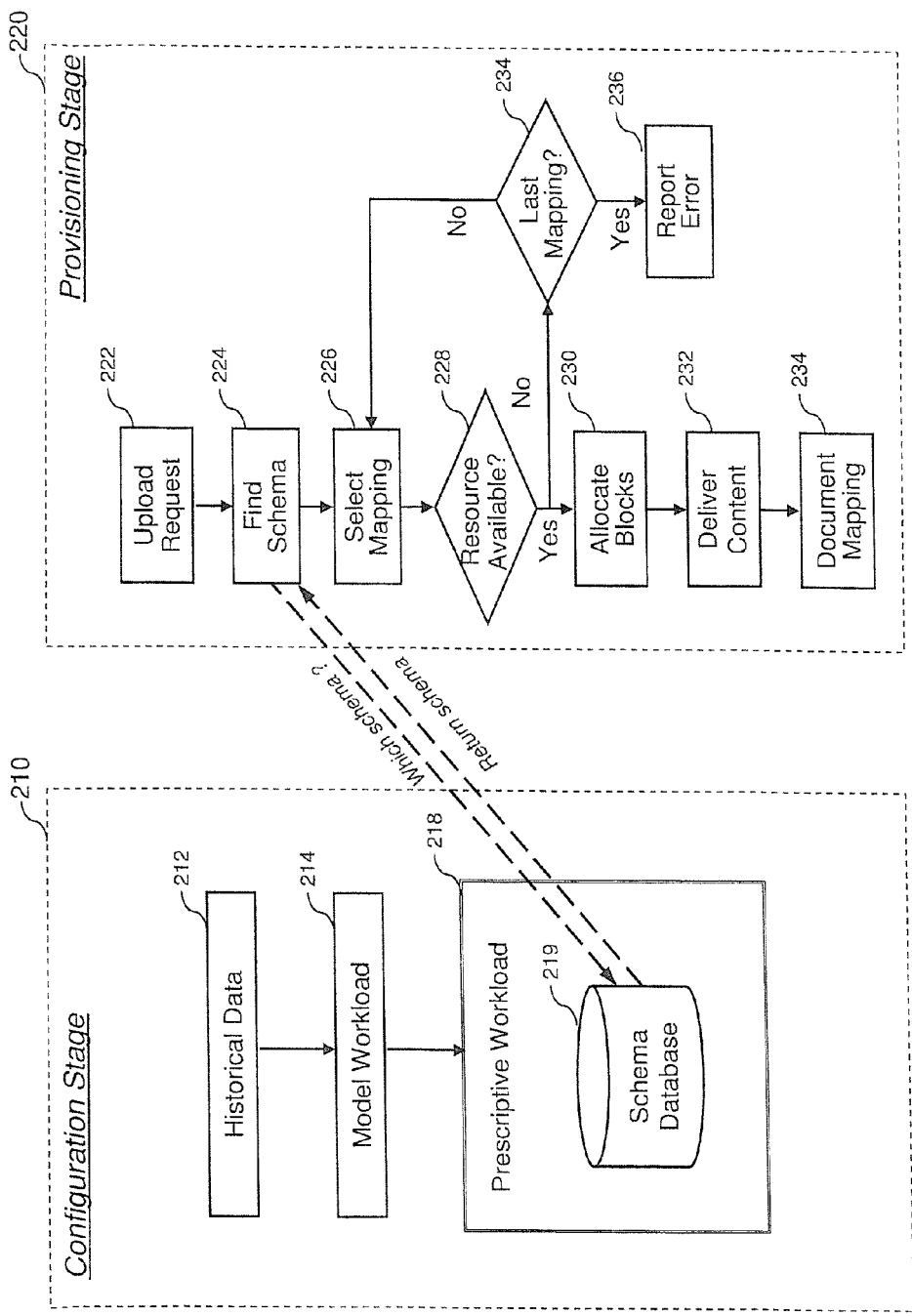
FIG. 2 is a flow chart illustrating the operation of model-based content provisioning.

Referring to FIG. 2, in one implementation of a model-based approach for content provisioning, the content provisioning service makes use of model-based partial solutions, which are obtained during a configuration stage 210, to pre-compute information that is later used during a provisioning stage 220 for determining a good arrangement of content on the storage resources of the system.

At the configuration stage 210, for example, empirical data 212 are used to generate a model workload 214 that represents a type of workload the system aims to support. Empirical data can range from a verbal description of the overall usage of video, through a detailed weblog of all events from a running system including video viewing events. One example of empirical data 212 is a statistical usage distribution provided by video store operators, characterizing the number of views per each title of a library over a 24-hour service window. Another example is a geographic profile of viewing habits among consumers across a wide range of areas. In view of the description provided herein, those of ordinary skill in the art will appreciate the type of empirical data and manner in which to select empirical data for a particular application. In situations where empirical data is unavailable or insufficient, other information including but not limited to customer projections of content usage and service objectives can also be used for creating the model workload 214.

The model workload 214 can be manually generated prior to being introduced to the system, or automated (e.g., in a heuristic way) by the system itself. Based upon the model workload 214, a prescriptive workload 218 is created. Very generally, the prescriptive workload 218 offers partial solutions to the problem of resource allocation by partitioning the problem space in a discrete way. A prescriptive workload 218 can be generated for example, by mapping the model workload 214 onto a particular system configuration—either 1) the system size is fixed and the workload is scaled to fit the system; 2) the workload is fixed and the system size is scaled to match the workload; or 3) a combination or both. In some applications where content attributes are provided as a characterization of operational objectives, the prescriptive workload 218 can be viewed as a partitioning of attribute space, defining a set of attribute-based categories (referred to herein as schemas) in which each individual can be mapped to a type of resource arrangement associated with that category. Several approaches to creating the prescriptive workload 218 will be described in greater detail later.

The prescriptive workload 218 can be represented in the system as a collection of configuration data (i.e., schema database 219) that describe how to provision and access objects in the system. The schema database 219 includes schemas and provision tables, which together provide a description of a definition of each schema and the resource arrangement associated with that schema. Take popularity-based content provisioning, for example. One schema can be defined to include titles in the top 5% of the most frequently viewed in the library. For a system that aims to provide a maximum of 800 Mbps bandwidth for each title in this category with an aggregate limit of 800 Mbps or more for all titles in the category, the schema database 219 describes the set of arrangement combinations that can support such a bandwidth goal, including for example, distributing content data across a span of eight disks. These types of information are later used during content provisioning to help the content provisioning service 124 to determine how to allocate resources in manner which addresses the operational objective(s) (here, accessibility) of the content.

In addition to providing the desired accessibility of the content, the prescriptive workload 218 and associated schemas are also configured to reduce a degree of inter-title contention in the system. Examples of a prescriptive workload which results in a high level of inter-title contention include storing four copies each of "Shrek I" and "Shrek II" on one single server that has a maximum readout rate of 100 Mbps. When "Shrek I" is at peak usage (e.g., streamed at 90 Mbps) that occupies most or all of the server's access capacity, the remaining data on this server (including "Shrek II") are rendered inaccessible, while resources of other servers in the system may be left idle. In comparison, a less contentious prescriptive workload, for example, stores one copy of "Shrek I" and "Shrek II" per server across four different servers, so that the peak usage of one object does not exceed 25% of a server's output capacity, without blocking access to other data on these servers.

During the provisioning stage 220, content provisioning service 124 makes use of information in the schema database 219 to provision content in the following way. Upon receiving a request 222 for uploading a piece of content, the content provisioning service first determines a proper schema for this content, by matching content attribute(s) against the partitioning results in the schema database (step 224). If, for example, this content ranks among the top 5% popular titles, the exemplary schema described above is selected. Accordingly, content data will be striped across eight disks. Given this eight-disk requirement, there still exists multiple ways of mapping content to the storage. For a system having 16 disks of storage, one option is to map content to disks number 1 through number 8, and a second option is to use disk number 9 through number 16 (and possibly other eight-disk combinations).

Among various mappings, content provisioning service 124 selects a best mapping, for example, the one with the lowest server occupancy (step 226). If there are sufficient resources available in this best mapping (step 228), content provisioning service 124 proceeds to allocate a set of physical blocks on each of the eight disk drives according to the best mapping (step 230) and subsequently, the administrative server 121 delivers the content data to these locations (step 232). If content provisioning service 124 fails to locate sufficient resources in the best mapping, it selects the next mapping to repeat the evaluation process 228 until an available mapping has been found and committed. In some situations when multiple copies of a piece of content are desired on the system, the content provisioning service may determine for each individual copy a best available mapping and store data accordingly. After data delivery completes, results of the mapping (including the disk locations of the data) are documented in the object directory 129, so that content can be conveniently accessed in the future by other services (e.g., admission service 126)

Usually, when the system is operating normally, there is space available for new content as long as the resources used by an aggregate of titles are within designed limits. In rare occasions, if none of the mappings are deemed available after an exhaustive search (e.g., due to system overbooking), an error 236 is reported. Errors can be handled by operator intervention, or alternatively by the system itself via other services (e.g., management service).

By partitioning the problem space and formulating partial solutions, model and prescriptive workloads can help content provisioning service 124 to manage resources across multiple dimensions in a more efficient manner. There are various approaches to creating good models. One approach, for example, is to perform k-ary subdivision in n-space, where k is a subdivision factor (e.g., k=2 is binary subdivision) and n is the number of independent attributes. Here, an attribute can be a characterization of one of operational objectives (such as popularity, resilience, and integrity), independent resource pools and their characteristics (such arrays of disks and the disks' model(s)), and/or other aspects in resource management.

It should be appreciated that, in general, operational objectives are not necessarily static. For example, popularity can vary over time. In another example, bandwidth availability at the point of delivery may require the mapping of attributes to resource pools to change as the content is being delivered.

Figure 3:
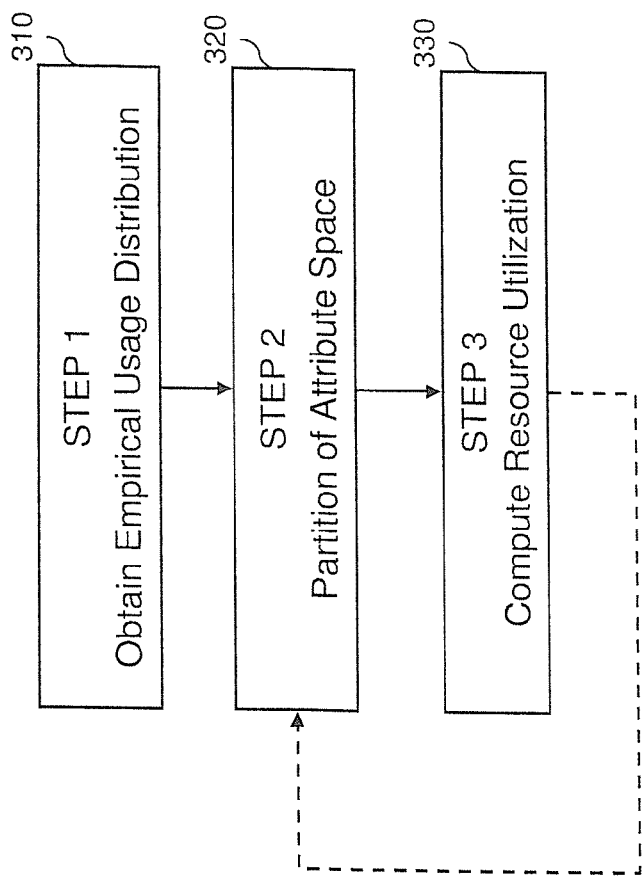
FIG. 3 is a flow diagram illustrating an exemplary approach for attribute-based modeling.

Referring to FIG. 3, very generally, some applications of attributed-based modeling proceed as follows.

STEP 1: Obtain empirical usage distribution that represents a pattern of access of titles in a library. Usage distribution can be a description of access rate (e.g., views per second, average number of concurrent views, Megabits per second) as a function of one or multiple attributes (e.g., title rank). Such information can be obtained either from actual usage data (e.g., store records from Netflix, Blockbuster, Hollywood Video and so forth), or based upon projections (e.g., using video rental data to extrapolate their usage characteristics). In some applications, a continuous mathematical model is formulated to describe usage data.

STEP 2: Partition the attribute space based upon usage distribution. Here, a set of schemas are defined, each being associated with ranges of one or multiple attributes (e.g., top 5 percentile of title rank). A schema generally describes how a title with a given set of attributes is assigned resources in the system. Each schema is mapped to a pattern of storage allocation, including for example, a combination of disks on which titles in this schema will be located and the number of copies that will be stored for each title.

STEP 3: Compute resource utilization (e.g., total amount of storage) by integrating resource requirements of each title of the library based upon the partitioning result. In some applications, the aggregate resource requirements serve as a basis for determining the number and types of storage servers that will be used in the system.

These three steps can be performed manually or automated in an iterative way to optimize one or multiple objective functions (e.g., cost, resource utilization, inter-title contention, power consumption), and further, by taking into consideration a set of constraints. For example, in situations where utility cost is sought to be reduced or even minimized, after the assignment of initial partitioning parameters, steps 2 and 3 can be iteratively performed to determine a good (or best) way of partitioning that yields a desired utility cost while satisfying certain constraints that limits some aspects of provisioning (e.g., the total amount of storage and maximum readout rate per disk). If the process at a particular step is not converging effectively, the previous step can be reentered and modified.

To illustrate further attribute-based modeling, two examples are described in greater detail below.

Figure 4A:
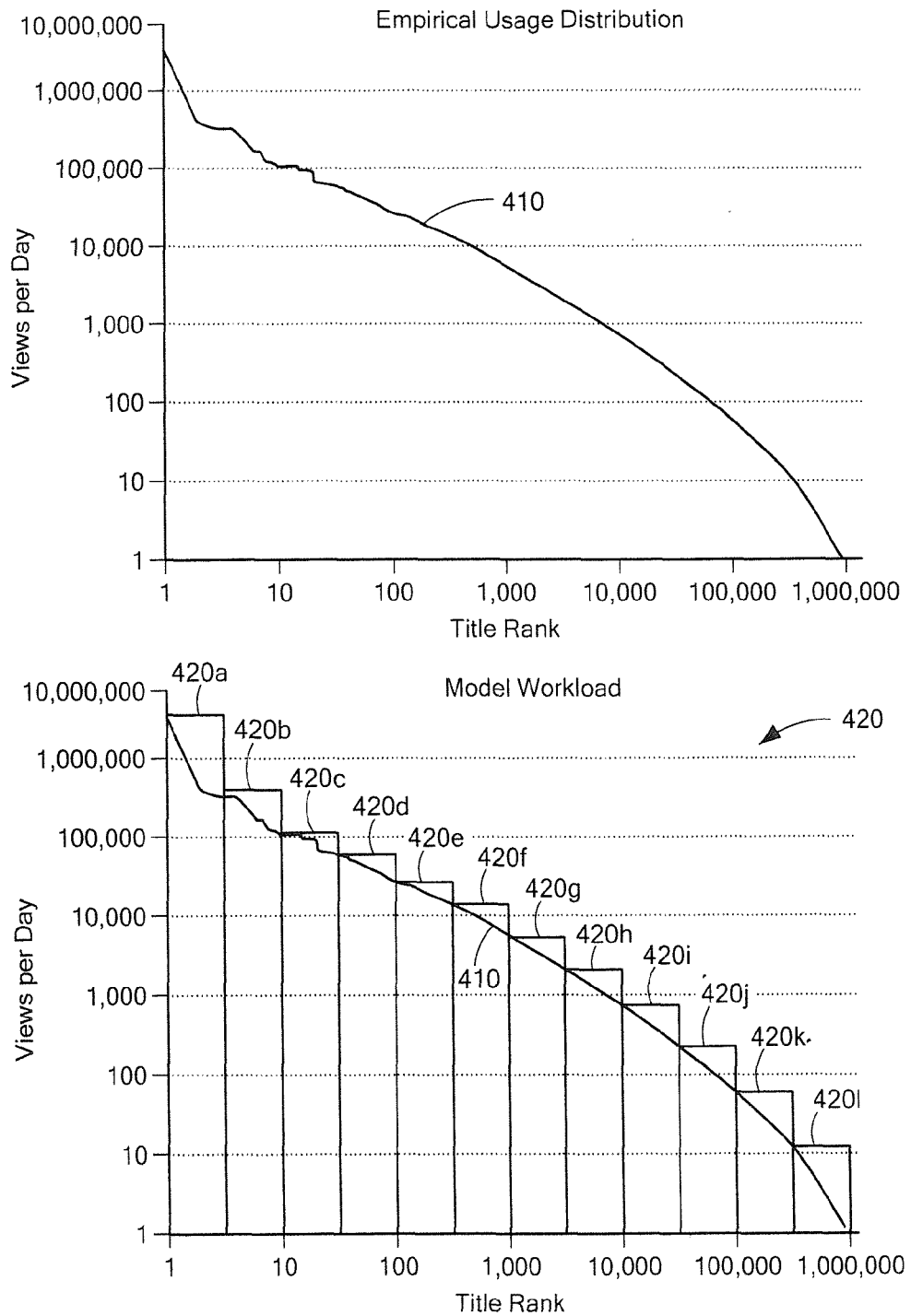
FIGS. 4A and 4B illustrate one example of modeling using a single attribute.
Figure 4B:
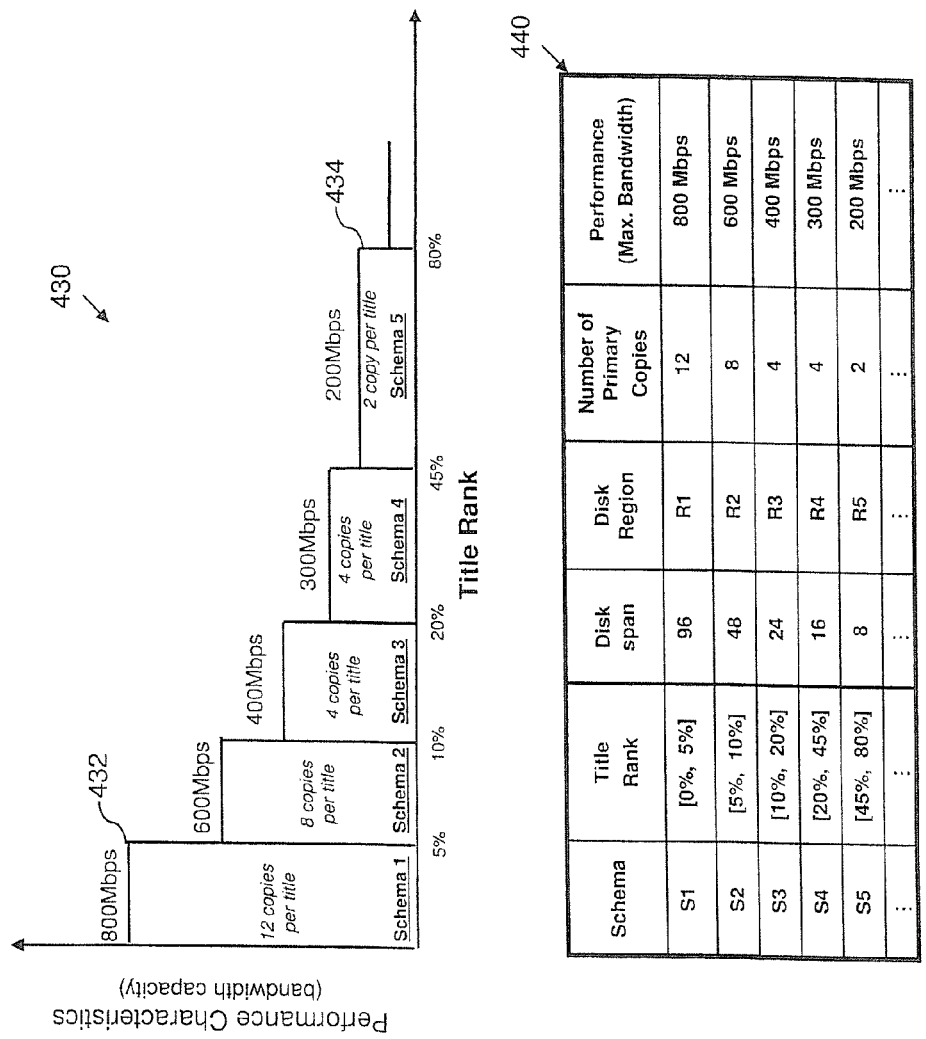

Referring to FIGS. 4A and 4B, in the first example, models for content provisioning are created based upon a single attribute—popularity. Here, popularity is an expression of anticipated demand for a piece of content. For example, if content is popular, demand for it will likely be high, and thus the provisioning system will attempt to provision the content with the resources necessary to meet the expected demand.

Graph 410 is a distribution of the access rate (e.g., views per day) of 1 million titles in a user generated video library plotted against popularity rank on a log-log scale. As shown in the graph, access rate (and therefore the demand for access bandwidth) varies widely from title to title. While some of the most popular titles are viewed more than a million counts per day, titles in the lowest rank are accessed no more than once per day. Generating a popularity-based model workload can thus allow system resources to be allocated in ways that are consistent with service objectives (such as title accessibility).

One way of creating a model workload that takes popularity into account is shown in graph 420. A set of quanta 420a-420l are created as a result of sub-dividing the continuous usage distribution curve 410. Each quantum is associated with a range of title rank within which all titles will share a partially determined allocation schema. This model workload provides a framework that later guides the process of content provisioning, e.g., by concentrating more system resources on individuals that have a greater demand. Note that, in producing the model workload, a full variety of quantization schemes (e.g., binary subdivision or ternary subdivision or even non-uniform and non-formulaic subdivisions) can be used. Different quantization schemes may have advantages or disadvantages with respect to different sets of empirical data, specific applications (e.g., providing content in distinct data categories such as movies or online ads), or system configuration that will be used to support the workload.

FIG. 4B illustrates one set of schemas that are applicable in this example. As shown in graph 430, each quantum that spans over a given range along the axis of title rank corresponds to a specific schema. Titles in the same schema share a set of pre-determined arrangements and service characteristics, including for example, the number of disks and disk region where each title will be stored, the number of primary copies of each title, and performance characteristics such as the maximum access bandwidth the system is able to offer, as illustrated in provision table 440. For instance, a title that falls within the top 5 percentile will be provisioned according to Schema 1 (S1)—that is, having 12 copies on the storage with each copy striped on disk region 1 (R1) across a span of 96 disks. Such an arrangement provides a maximum of 800 Mbps access bandwidth.

Based upon the schemas, the amount of storage capacity needed for the entire library can be computed and used for determining hardware requirements for the system. For example, if the amount of storage needed for 1M titles is approximately 90 TB according to the prescriptive workload, the system can be configured to include 96 1 TB disks organized as 4 servers each with 24 disk drives. Further, if it is desired to provide an access bandwidth of 36 Gbps for servicing 40K simultaneous sessions (each session encoded at 900 Kbs) on the system, each disk drive is selected to have at least a sustained readout rate of 400 Mbps.

Figure 5:
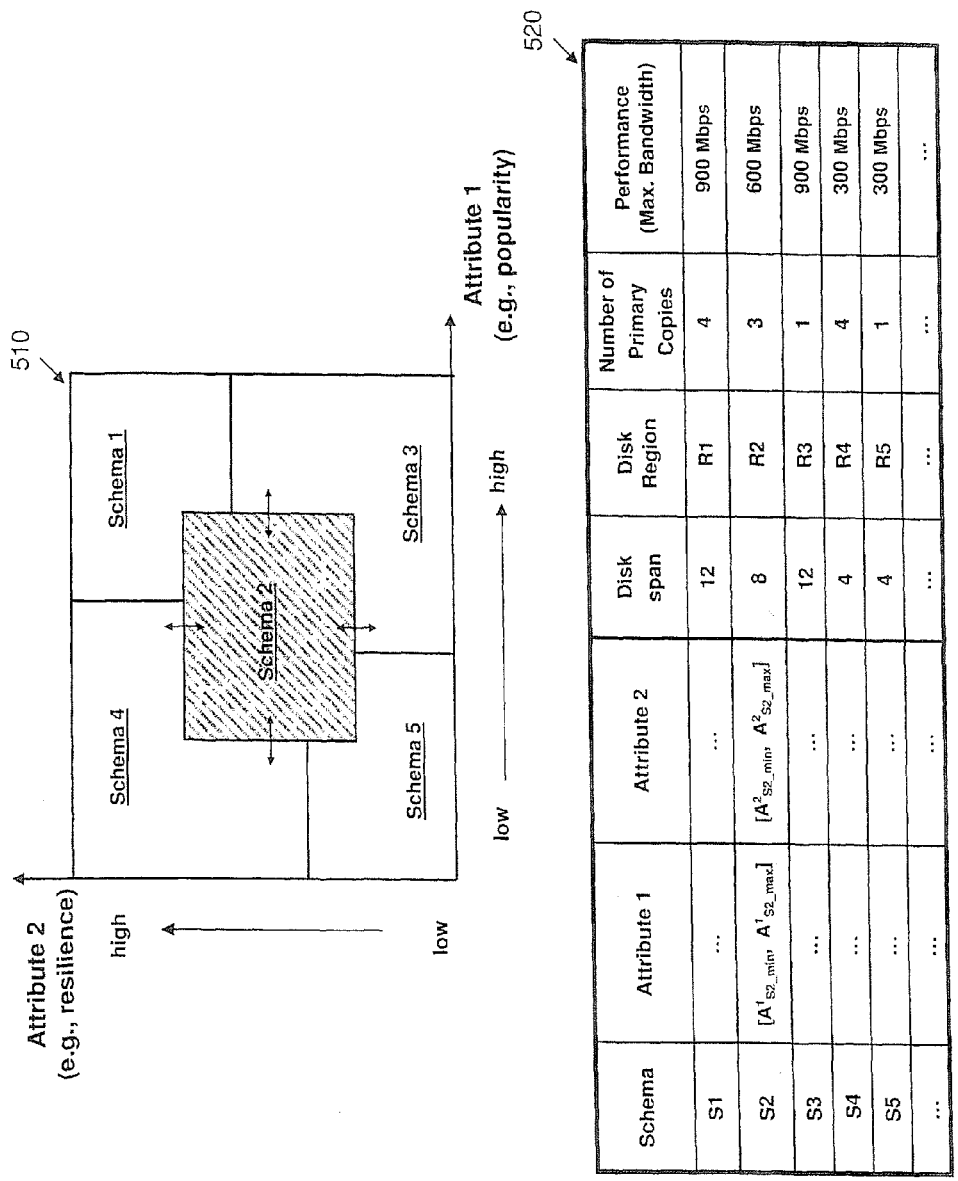
FIG. 5 illustrates another example of modeling using multiple attributes.

Referring to FIG. 5, in the second example, two set of attributes (e.g., popularity and resilience) are both used in creating a model workload. In this description, resilience relates to a predicted level of service maintained to an information object in the presence of component failure. For example, in accessing a resilient object, a customer encountering a failed read on disk A can continue to be serviced through reading an alternative copy of data on disk B. Generally, the more resilient an object needs to be, the more resources (and possibly the more types of resources) the content provisioning system needs to allocate to that object.

Graph 510 illustrates an exemplary subdivision of a two-dimensional attribute space. In contrast with the single-attribute modeling, each schema is now defined by combinations of ranges of each of the two attributes. Again, titles in each schema are assigned with a set of pre-determined arrangements and service characteristics. For example, titles in Schema 1 correspond to both high resilience and high popularity, and are therefore each stored with 4 primary copies in the fast region (R1) of 12 disks to provide good resilience and accessibility. In comparison, titles in Schema 5 correspond to both low popularity and low resilience, and are therefore each stored with only one primary copy in the slow region (R5) of 4 disks. Each schema can be defined by specified ranges of attribute values. For example, Schema 2 is defined by popularity attribute value in the range of $[A^1_{S2\_min}, A^1_{S2\_max}]$ and resilience attribute value in the range of $[A^2_{S2\_min}, A^2_{S2\_max}]$. This schema provides that each of the three primary copies of the title will be written in R2 across a span of 8 disks. This arrangement gives rise to a 600 Mbps access capacity supportable by the system for each title in S2.

In some applications where more than two attributes are used for generating model workload, subdivision of multi-dimensional attribute space can be performed using a similar approach. For example, each schema will be defined by combinations of value ranges of each one of these attributes. Once a title is allocated to a proper schema based upon its attribute values, content provisioning is performed according to the pre-determined arrangements assigned to this specific schema.

Another example of attributes that can be used for generating model workload is integrity. In this description, content integrity relates to the ability to recover content after a component failure, even a catastrophic failure of the system. For example, if a disk fails completely and is unrecoverable, the portions of content contained on the disk can be recovered from an alternate copy of the content within the system or across systems and/or from an encoded reconstruction method.

Other examples of attributes include geographical affinity and exclusion, topological affinity and exclusion, and power consumption.

In some examples, manual or automated optimization can be incorporated in modeling to achieve one or multiple design objectives. One design objective can be, for example, to make best use of available resources, given that the number and types of storage servers have been determined prior to modeling. Another design objective can be to minimize the overall system resource requirements while satisfying the service goals of individual or an aggregate of titles, if hardware components of the system are yet to be determined.

To perform optimization, generally, an objective function is first defined and the inputs that can minimize or maximize its value are determined. (Sometimes, a group of constrains are imposed on the values that the inputs can take.) In the example described in FIG. 5, the definitions of schemas can be viewed as inputs to an objective function of utility cost that needs to be minimized. Beginning with an initial set of inputs (e.g., the current boundary conditions of the schemas in the figure), an optimized set of schema definitions may be found by making small steps of adjustments in the inputs (such as moving the boundaries of Schema 2 along each attribute axis) to arrive at conditions that yield the lowest system cost. (See Re-Modeling below for adjusting model and schemas to optimize a running system.)

In some systems, one advantage of using a model-based approach to manage resource allocation is that the performance and behavior of components and subsystems can be tested prior to building the entire system. The model can be refined to the subsystem or component level, and tests can be devised for the subsystem or component prior to incorporating it into the overall system. For example, multilayer test scripts can be used to test and qualify subsystems on various levels (e.g., an individual disk drive, a group of disk drives, and a complete storage server) and ultimately be extended to the entire system (which includes access servers, storage servers, disk scheduler, and so forth). The test results are analyzed and used to determine a desirable system configuration or modification. These results may also provide a verifiable performance objective for the next level of system development.

Once content has been successfully provisioned to the system and been made available for access, the actual usage of the content may be tracked by collecting content statistics (such as session counts and bandwidth consumption) from storage and access servers. The actual usage of an object may deviate from its level of provisioning, and large deviations can affect overall efficiency of resource utilization. For example, over-provisioned objects may be consuming resources that are not put in active use yet nonetheless are prevented from being allocated for other objects, whereas in the mean time, under-provision objects are assigned insufficient resources resulting in incoming access requests being rejected. Therefore, in order to enable the system to continue to operate in a globally optimal state, a content re-provisioning service is provided.

There are many situations in which content re-provisioning may be desired. A first situation occurs when a title is initially provisioned without attributes (e.g., placed in a default schema and provisioned accordingly), the actual usage of that tile is later used to determine which schema is appropriate to use and whether the title needs to be re-provisioned. A second situation occurs when a title is initially provisioned using attributes that are not representative of the actual usage (e.g., when marketing promotion boosts a movie's near term popularity), the system detects the discrepancy ("anomaly") between the actual and provisioned levels and orders the title to be re-provisioned by selecting a schema most reflective of the title's actual usage. A third situation of content-repositioning occurs when there is a planned lifecycle management of attributes (e.g., "aging"), and titles are scheduled to be moved between schemas on a pre-determined basis, for example, providing progressively less bandwidth for a title over the lifetime of its release cycle.

In each one of these situations, the content re-provisioning service provides at least two types of operations: 1) up-provisioning, which upgrades provisioning to a higher-level schema that will generally assign more resources to the content; and 2) down-provisioning, which downgrades provisioning to a lower-level schema to release some amounts of resources back to the system. These operations are described in greater detail in the context of anomaly-based and threshold-based content re-provisioning.

Generally, anomaly-based and threshold-based content re-provisioning deals (1) with content that has been provisioned using attributes that are not representative of its actual usage or (2) with content whose usage has unpredictably changed such that the provisioning is no longer representative of and appropriate for its actual usage. In addition to being a result of incorrect schema assignment (e.g., due to inaccurate data and/or default schema assignment), "anomaly" can be caused by many other factors, including for example, certain marketing initiatives and unpredictable events (such as the death of an actor) that results in a change in content's near term popularity. When anomaly is detected, or the usage of a piece of content crosses a threshold that indicates that the content is over or under provisioned, then that piece of content will automatically be re-provisioned. Another anomaly occurs when the expected bandwidth of the viewer cannot be realized. In this case an alternate representation (e.g., lower bit-rate encoding) may need to be instantiated (for example, through H264-SVC, a video compression standard).

One example of anomaly-based re-provisioning is described in detail below.

Figure 6:
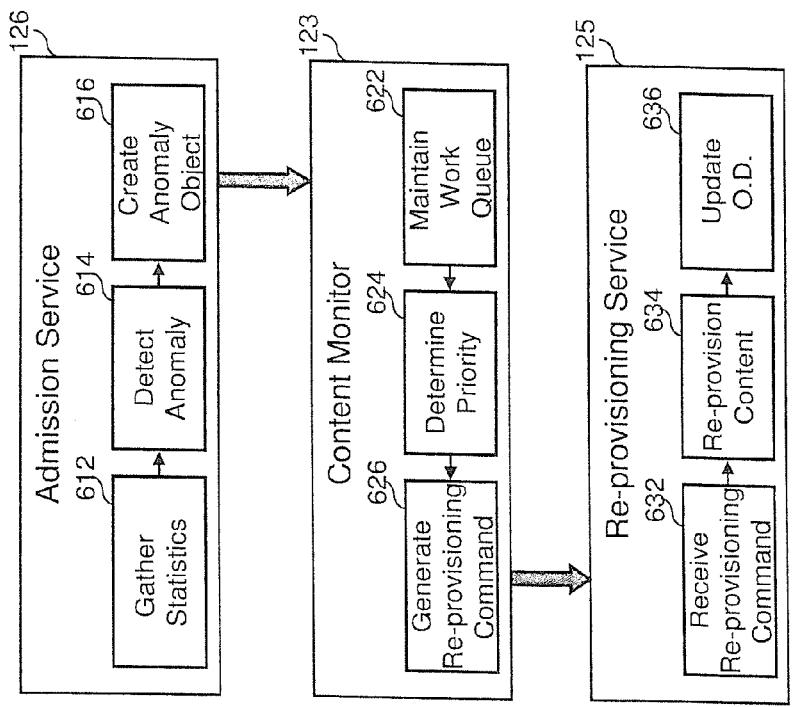
FIG. 6 is a diagram illustrating an exemplary approach of anomaly-based content re-provisioning.

Referring to FIG. 6, the content re-provisioning service 125 interacts with other services in the system, including the admission service 126 and content monitor 123, to provide the following functionalities.

The admission service 126 gathers and maintains a set of running statistics for each piece of content that is currently being accessed (step 612). Examples of running statistics include the number of admitted concurrent sessions for each object and the total usage across all objects at any given time and over time. The admission service 126 also maintains provisioning anomaly threshold on a per schema basis as part of a service configuration file (step 614). When the actual usage of a title (e.g., an instant access rate) has crossed the anomaly threshold for its corresponding schema (including, for example, exceeds a predetermined threshold for up-provisioning, or falls below a predetermined threshold for down-provisioning), which indicates an unexpected transient usage, a provisioning anomaly object is created (step 616) and provided to the content monitor 123.

The content monitor 123 maintains a work queue (step 622) of provisioning anomaly objects submitted by the admission service 126, and determines and preferably prioritizes a list of outstanding re-provisions (step 624). For example, based upon the type of each provisioning anomaly, the content monitor 123 determines whether the anomaly can be remedied by re-provisioning. For content that requires up-provisioning, but is already at the top level of provisioning, a "Provisioning Anomaly Not Repaired" event will be sent and no further processing is required for that content. In some examples, the content monitor 123 places content to be up-provisioned at higher priority in order for the system to be able to admit as many future service requests related to the content as possible. In some other examples when resources for up-provisioning are not immediately available, requests to down-provision content are honored prior to requests to up-provision in order to free up system resources for up-provisioning. For each item on the list of outstanding re-provisions, the content monitor 123 determines a set of new attributes that are representative of its actual usage and subsequently generates a re-provisioning command (step 626) to instruct the re-provisioning service 125 to re-provision the item accordingly.

After content re-provisioning service 125 receives the re-provisioning command (step 632), content is re-provisioned based upon the new attributes (step 634). Similarly to a general content provisioning procedure described earlier, the re-provisioning service 125 selects a schema corresponding to the new attributes, and assigns resources to write new copies of the content on the storage according to the schema. When content has been given its new provisioning, the re-provisioning service 125 updates content information in the object directory (step 636) and removes old instances of content data from the storage.

In addition to anomaly-based re-provisioning, another type of re-provisioning uses a threshold mechanism to make re-provisioning decisions by taking into account short-term and/or long-term variability (e.g., a viewing trend) of title usage. One example of threshold-based re-provisioning is described below.

Once a title has been stored on the system and made available for access to customers, the usage (or popularity) of this title will naturally change. A new title (e.g., movie, TV episode, news segment) often experiences high usage when first introduced; over time, usage typically decreases, although usage of different titles may decrease at different rates. In some cases, a new title (e.g., a user generated video) will experience very little usage when first introduced, and remain at little or no usage over its entire lifetime; however, social buzz may bring attention to some of these titles resulting in an increase in usage. As the attention wanes, usage decreases.

In this example of threshold-based re-provisioning, a trend of usage of a title is monitored (for example, by computing the first derivative of the title's viewing rates with respect to time). This trend is then measured against a threshold to determine whether the usage of the title follows a projected trend of this title. This projected trend can be configured on a per schema basis (i.e., every title in the same schema is associated with a same/similar projected trend), or alternatively, configured specifically for each title based upon its own characteristics (e.g., depending on attributes such as the type and content of titles). If the actual trend of usage of a title substantially deviates from the projected trend (e.g., the title is experiencing a usage increase during the past week as opposed to a projected slow decay), the title will be placed in a re-provisioning list to be re-provisioned. In many cases, re-provisioning actions initiated by threshold-based re-provisioning decisions are conducted by the system at convenient time (e.g., during times of light service load) to reduce disturbance to other operations of the system.

There are several algorithms that can be used in this example of threshold-based re-provisioning. A first implementation is based upon a non-weighted backwards looking time window and usage threshold. By discrete sampling of continuous time events, usage distribution of a title is estimated and compared with threshold to determine whether re-provisioning actions need to take place. A second implementation is based upon a time-sensitive weighted moving average/sum of usage of a title. More specifically, in recognizing that empirical usage events inherently exhibit a statistical probability that fit a distribution function, a distribution function is used to weight the trailing moving average/sum. This second implementation can reduce sampling errors and aliasing that may occur in a non-weighted implementation, and improve overall system efficiency.

In some examples, usage distribution of a title is estimated using a mean-field approach. More specifically, this approach keeps track of the mean of the access (or demand) rates of a title over a period of time. This mean is then compared with a targeted level of usage associated with the schema to which the title is provisioned in order to guide the up and down-provisioning of data along existing schemas. For example, for all titles in a given schema $S_k$, a down-provisioning threshold may be set at 80% of the provisioned usage level of $S_k$. A title whose demand on average is below this down-provisioning threshold will then be down provisioned to a lower schema to free up some of its occupied system resources for other use.

In some other examples, usage distribution is estimated using a statistical approach that takes into account not only the average behavior but also the variability (such as the variance) of title usage. Considering the probabilistic nature of title usage, this approach can be useful in situations, for example, when the system contains titles whose usage fluctuate significantly at different times during a day (e.g., morning versus evening), and when it is desirable to differentiate resource allocation among titles who exhibit distinct usage patterns but nonetheless generates comparable amount of daily or weekly traffic.

The following section provides an example of a down-provisioning approach that makes use of both the mean and the variability of title usage in decision-making. In this example, the usage variability in time is estimated by computing higher order characteristics of a set of discrete time sampled data, such as the standard deviation of a title's instant access rates over a predetermined time window.

Figure 9:
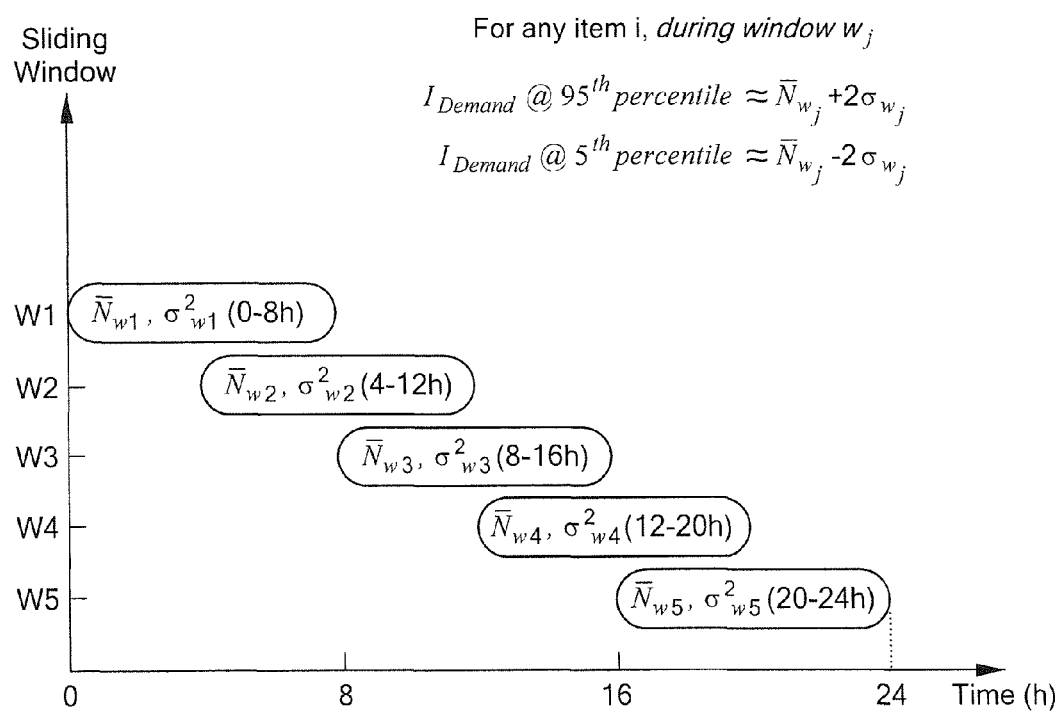
FIG. 9 illustrates one example of content re-provisioning that makes use of down-provisioning threshold.

Referring to FIG. 9, in this example, usage statistics are collected based upon a non-weighted sliding window method, which successively tracks the average and the standard deviation of demand over a sequence of overlapping time windows of a pre-determined length.

In describing the specifics of the sliding window method, a set of system parameters are defined below for convenience. These parameters may apply to all titles in the system and affect the statistics gathering frequency globally.

Each title is sampled at a rate of $T_{sample}$ to obtain usage data. For example, when $T_{sample}$ is selected to be 10 minutes, the aggregate usage (download) rate of a title over each 10-minute interval is periodically reported to the content re-provisioning service 125, for example, according to usage statistics maintained by the Admission Service 126.

Based upon the sampled data, the mean and the variance of the usage of a given title $i$ are calculated over a time window $T_{window}$. For example, when $T_{window}$ is selected to be 8 hour and $T_{sample}$ equals 10 minutes, the system uses 48 sampled data points (8×60/10) collected over each window $w_j$ to compute statistical parameters characterizing the usage pattern of title $i$, including: 1) the average demand $\overline{N}_{w_j}$ and 2) the variance $\sigma_{w_j}$ in demand. These statistical parameters are then used by the content re-provisioning service 125 in determining whether the title qualifies as a down provisioning (DP) candidate. In some examples, this determination is made by the end of each $T_{Window}$, whereas in some other examples, this determination is made less frequently, for instance, once over a set of time windows.

To obtain the time distribution of title usage, the mean and variance of title usage are successively monitored over a sequence of time windows each separated by a distance of $T_{Sliding\ Window}$ in time. In other words, $T_{Sliding\ Window}$ is the time difference from the onset of window $w_j$ to the onset of the next window $w_{j+1}$. In this example, $T_{Sliding\ Window}$ is selected to be 4 hours, which results in a 50% of data overlap between $w_j$ and $w_{j+1}$.

In each execution cycle $T_{Execution}$, the content re-provisioning service 125 executes down-provisioning actions, such as selecting a DP candidate(s) to be down-provisioned and subsequently moving data of the selected candidate(s) from the existing set of disk sectors to a newly allocated set of disk sectors. Typically, the system performs the down provisioning execution at a relatively low frequency, in this example, $T_{Execution}$ equals 24 hr, to avoid significant interference or disruption to other operations in the system.

Based upon the usage statistics obtained by the sliding window method described above, the content re-provisioning service 125 makes uses of a set of down-provisioning criterion to make a two-stage decision, as described below.

Stage One—Identifying Down Provisioning Candidates

At this first stage, the content re-provisioning service 125 searches for titles whose actual usage significantly deviates from its provisioned level and identifies these titles as DP candidates. This process can be done, for example, by measuring the statistical usage of each title over a sufficiently long time $T_{window}$ (e.g., 8 hrs) and then comparing this statistical usage against a threshold level $TH_k$ of usage (refereed to as DP threshold) that is determined for the current schema $S_k$ to which the title is provisioned.

Figure 10:
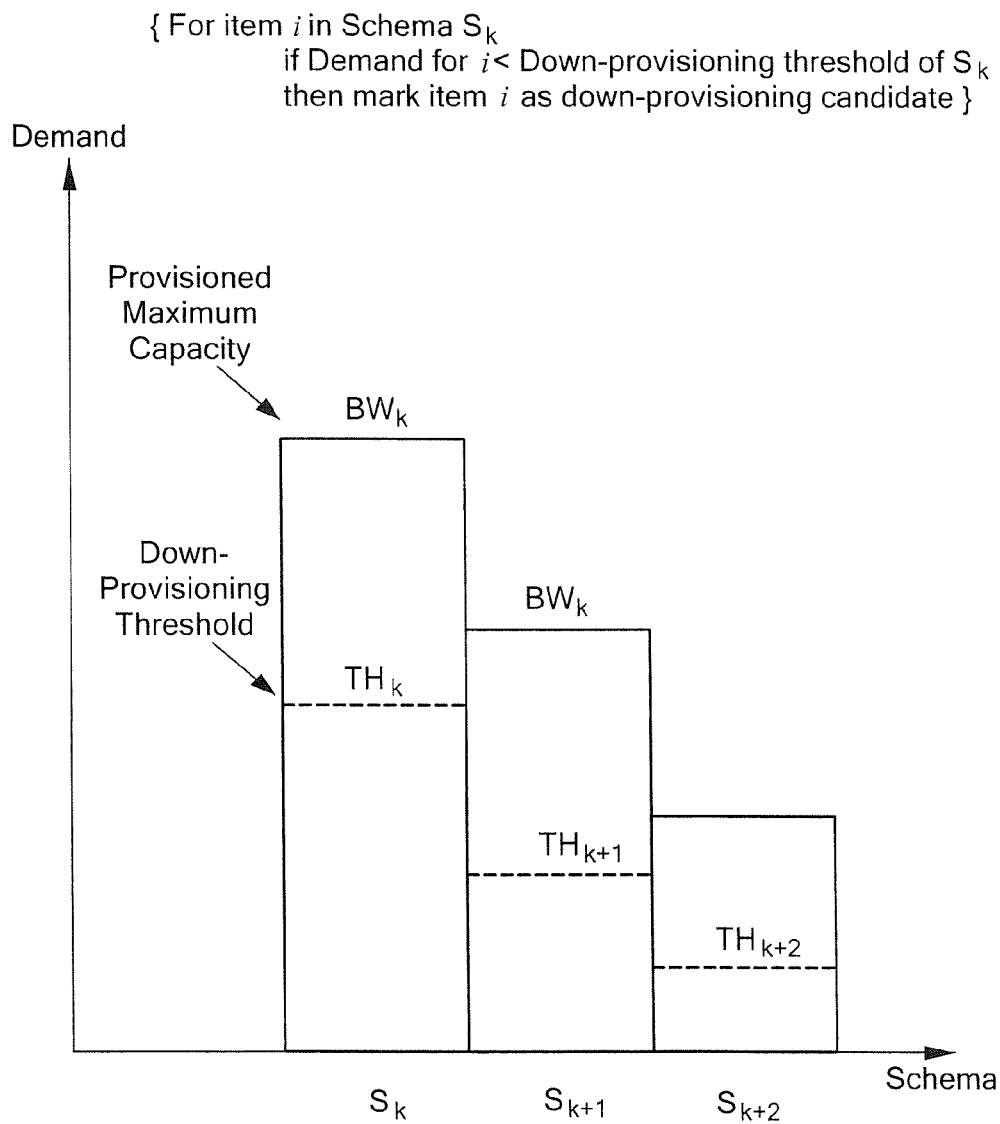
FIG. 10 illustrates one example of determining the statistical demand of a title.

Referring now to FIG. 10, in some examples, each schema $S_k$ has a threshold level $TH_k$ which is lower than the provisioned maximum bandwidth $BW_{k+1}$ of the next schema $S_{k+1}$. A title in $S_k$ whose demand level $I_{Demand}$ remains consistently below $TH_k$ qualifies as a DP candidate.

In some examples, the demand level $I_{Demand}$ can be represented by the mean $\overline{N}_j$ of sampled usage data over window $w_j$. Accordingly, a title whose average use is below the DP threshold is marked as a DP candidate.

In some other examples, the demand level can be represented by the $P^{th}$ percentile of the sampled usage data, namely, a level below which P % of all sampled usage data fall. When P is selected to be 95 and assuming a normal distribution of the sampled data, $I_{Demand}$ can be obtained by:

$$I_{Demand} = \overline{N}_{w_j} + 2\sigma_{w_j}$$

where $\overline{N}_j$ is the mean demand, and $\sigma_{w_j}$ is the standard deviation. Accordingly, a title is marked as a DP candidate if its usage appears to be below the DP threshold for at least 95% of the sampling times. For other P values, $I_{Demand}$ can be approximated by the sum of $\overline{N}_j$ and $K_p$ times $\sigma_{w_j}$, where $K_p$ is a multiplier whose value is determined based upon P (e.g., using the central limit theorem).

Stage Two—Executing Down Provisions

At this second stage, the content re-provisioning service 125 determines a selected group of DP candidates to be down provisioned and executes the corresponding down provisioning operation, for example, once per execution cycle $T_{Execution}$.

In some examples, during each execution cycle $T_{Execution}$, only a limited number of DP candidates, for example, the high-priority candidates, are down provisioned. This can be done, for example, by ranking all DP candidates by the amount of deviation from the DP threshold (i.e., $TH_k - I_{Demand}$). The top ranked DP candidate(s), such as the title with the lowest demand relative to the DP threshold, is then down provisioned. In some examples, down provision only occurs upon satisfaction of a predetermined set of execution conditions including, for example, when the system load is sufficiently low and schema $S_{k+1}$ (i.e., the target schema for this DP candidate) has sufficient resources that can be allocated for this action.

In some examples, schedule-based content re-provisioning is performed as a result of lifecycle management, for example, a title that is expected to receive decreasing usage over time can be provided progressively less bandwidth over time in a planned manner. Generally, schedule-based re-provisioning process runs in the background at low priority to keep its impacts on other operations at minimum. One example of schedule-based content re-provisioning proceeds as follows.

Figure 7:
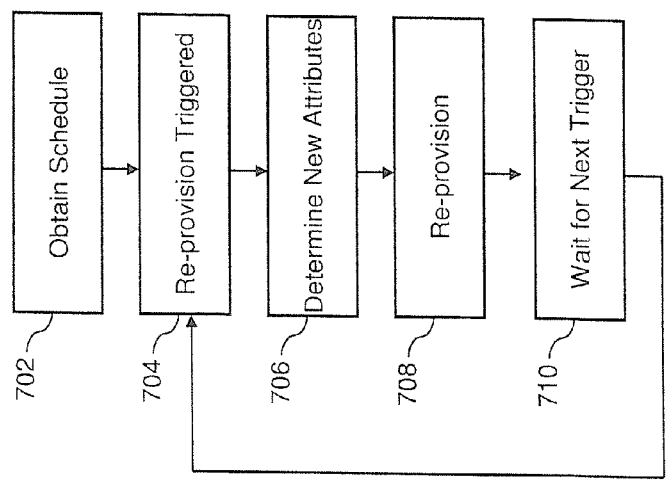
FIG. 7 is a flow chart illustrating an exemplary implementation of schedule-based content re-provisioning.

Referring to FIG. 7, initially, re-provisioning schedules are associated with the titles in the system (step 702). A re-provisioning schedule can be determined manually (e.g., planned by operators based upon domain knowledge), or automated (e.g., using a content aging function modeled by gathering content statistics and analyzing a trend of access pattern). The schedule may contain a beginning reference point for the lifecycle and a series of planned re-provisioning actions to be taken (e.g., re-provision a title from its current schema to another specified schema or make a specified change in the title's attributes) and when to take these actions (including, for example, a set of clock time that triggers the actions). Once established, the re-provisioning schedule can be later revised based upon the object's actual usage over time and overall system objectives.

When a re-provisioning action is triggered, for example, by a clock time or other triggering events (step 704), a title's new attributes are computed based upon the schedule (step 706). The title is then re-provisioned using these new attributes (step 708). After this re-provisioning action completes, the re-provisioning service waits for the next start point to begin another round of re-provisioning actions (step 710).

In some embodiments, the re-provisioning schedules are configured on a contractual base. For example, a schedule includes the start dates/time for a set of re-provisioning actions, and the specifics of the actions to be taken at the time (e.g., a specified provisioning level of the title in each action).

In some other embodiments, the re-provisioning schedules further include a set of usage models configured for re-provisioning purposes, where each usage model corresponds to a particular set of re-provisioning actions. During system operation, the actual usage of a title is measured against the set of usage models to determine the best-matching usage model. The re-provisioning service then re-provisions the title according to the actions corresponding to the best-matching model. At the next trigger when the title is scheduled to be re-provisioned again, if the actual usage of the title is faithful to the usage described in the previously-identified best-matching model, the title will be re-provisioned, again, according to the actions corresponding to this model. If however, the actual usage deviates significantly from what is described in the previously-identified best-matching model, a new best-matching model is selected for the title. Subsequently, the title is re-provisioned according to the set of actions corresponding to this new model.

Generally, the services involved in content re-provisioning, such as content re-provisioning service 125 and content monitor 123 can be provided by one or multiple physical servers. These servers may be one or more access server platforms 120 (as shown in FIG. 1), or one or more external re-provisioning platforms, or a combination of both.

As described earlier, when actual usage of an individual piece of content appears to be inconsistent with the schema to which the content has been provisioned, the content re-provisioning service is used to re-assign the content to an appropriate schema that can more accurately represent the actual usage. However, in some situations, if such inconsistency occurs on a broader scale, a significant number of re-provisioning requests may occur in the system or the re-provisioning requests can be satisfied, which can cause re-provisioning storms that can unbalance the system and threaten its performance and stability. In addition, when a large portion of the actual workload is performing at levels that deviate from prescribed levels, the prescriptive workload itself may no longer be appropriate for the system achieving desired performances and behavior. Moreover, there are certain system updates (e.g., loss of a failed server or addition of new servers to the system) that will affect the amount of available resources that can be allocated and thus the way content should be provisioned. In those cases, system reconfiguration and/or remodeling on a global scale is recommended. In some embodiments, the system's actual usage is now used as new empirical data (a new 212) to create a new model workload, a new prescriptive workload, new schemas and so forth; these may represent a minor or major change to the system, depending on the extent of differences between previous and new empirical data and system objectives.

Figure 8A:
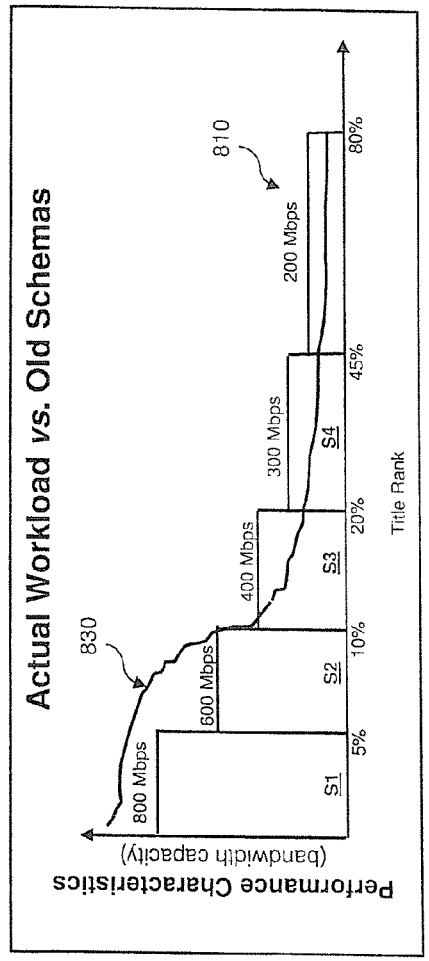
FIGS. 8A and 8B illustrate one example of re-modeling.
Figure 8B:
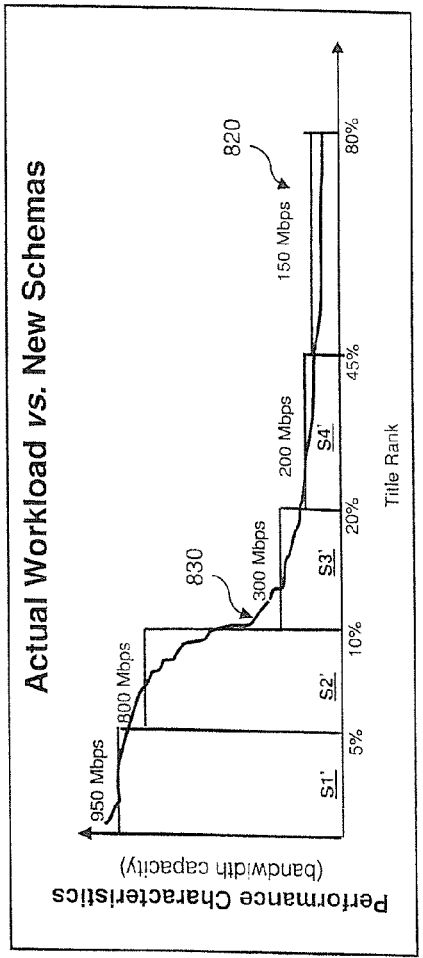

Referring to FIGS. 8A and 8B, in one example, when a large discrepancy is detected between an actual workload 830 of the system and the prescriptive workload 810 that is currently in use for content provisioning, re-modeling is performed to configure a new prescribed workload 820 (including schemas and provision tables) that better match the actual workload 830. As shown in the actual workload 830, titles that are assigned in the first two quanta are under-provisioned because their access rates on average are substantially higher than prescribed levels (i.e., 800 Mbps and 600 Mbps, respectively). By contrast, titles in the remaining quanta are over-provisioned with bandwidth capacities that are not fully consumed during system operation. As a result, the maximum total system performance can be much lower than that was previously designed.

One way to recover such a loss is to rebalance the relative allocation of resources among schemas, as illustrated in the new prescriptive workload 820. Here, the access bandwidth for titles in the first two quanta is raised to 950 Mbps and 800 Mbps, respectively, whereas the rest of the library has been decreased to lower levels accordingly. A new set of schemas (S1', S2', S3', S4', and so forth) now replaces the previous set (S1, S2, S3, S4, and so forth) to reflect the changes in resource allocation.

Note that in the example described above, a pattern of resource allocation associated with each schema (e.g., disk span and disk region) is affected, but the boundaries of schemas (i.e., the definition of schemas based upon divisions of attribute space) remains unchanged. Though, this need not be the case. There are many different ways to create new prescriptive workloads in re-modeling. One alternative way, for example, involves a change in the partitioning of attribute space (e.g., by modifying boundaries of schemas and/or the total number of schemas) and/or the pattern of resource allocation that is mapped to each of the schemas.

Once a new prescriptive workload has been configured, future upload requests will be handled by the content provisioning service according to the new schemas. Previously-provisioned content, on the other hand, can be gradually re-provisioned and migrate into new locations to bring the system back toward optimality. The old and new prescriptive workloads may coexist in the system during this period to facilitate this migration.

Another example of re-modeling occurs with the addition of new resources, e.g., servers, to the system. If the above examples represent a system of 4 storage servers and 4 access servers, expanding the system to, for example, 6 storage servers and 6 access servers can result in a 50% increase in system resources to be allocated. (Here, the number of storage and access servers need not be the same.) Depending on expected new system usage, at least three changes to the prescriptive workload can be made. (1) If the system is being increased because the systems is becoming filled with more lower-popularity titles, then one or more lower-popularity schemas can be added. (2) If overall system usage is increasing and the proportion of usage across titles is as before, then all schemas are proportionally provided more system resources. (3) If the system is being increased because more higher-popularity titles are being added, then one or more higher-popularity schemas can be added. Note that these three scenarios are not exhaustive.

Figure 11:
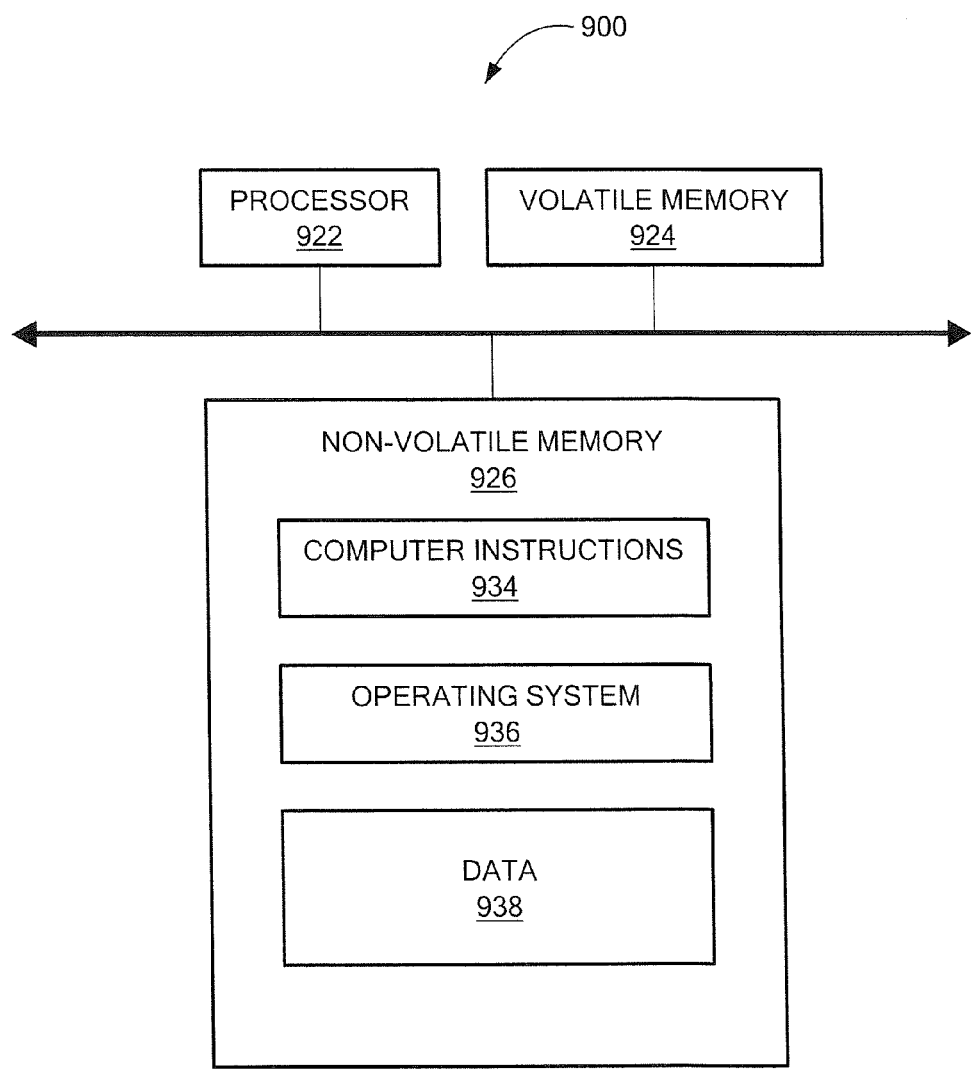
FIG. 11 is an example of a computer to implement one or more of the processes in FIGS. 2, 3, 6 and 7.

Referring to FIG. 11, an example of an implementation to perform one or more of the processes in FIGS. 2, 3, 6 and 7 is a computer 900. The computer 900 includes a processor 922, a volatile memory 924 and a non-volatile memory 926. The non-volatile memory 926 stores computer instructions 934, an operating system 936 and data 938. The data 938 may include a model work load, a prescriptive workload, empirical data, schema and attributes. In one example, the computer instructions 934 are executed by the processor 922 out of volatile memory 924 to perform all or part of the processes described herein (e.g., all or part of one or more of the processes in FIGS. 2, 3, 6 and 7).

The processes described herein (e.g., the processes in FIGS. 2, 3, 6 and 7) are not limited to use with the hardware and software configuration shown in FIG. 11; they may find applicability in any computing or processing environment and with any type of machine or set of machines that are capable of running a computer program. The processes described herein may be implemented in hardware, software, or a combination of the two. The processes described herein may be implemented as a set or subset of services in computer programs executed on programmable computers/machines that each includes a processor, a storage medium or other article of manufacture that is readable by the processor (including volatile and non-volatile memory and/or storage elements), at least one input device, one or more output devices, and a network connection. Program code may be applied to data entered using an input device to perform the processes described herein and to generate output information.

The system may be implemented, at least in part, via a computer program product, (e.g., in a machine-readable storage device), for execution by, or to control the operation of, data processing apparatus (e.g., a programmable processor, a computer or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein (e.g., one or more of the processes in FIGS. 2, 3, 6 and 7). The processes described herein may also be implemented as a machine-readable storage medium, configured with a computer program, where upon execution, instructions in the computer program cause the computer to operate in accordance with the processes.

The processes described herein are not limited to the specific embodiments described. For example, the processes in FIGS. 2, 3, 6 and 7 are not limited to a specific processing order. Rather, any of the processing blocks of FIGS. 2, 3, 6 and 7 may be re-ordered, combined or removed, performed in parallel or in serial, as necessary, to achieve the results set forth above.

The processing blocks in one or more of the processes in FIGS. 2, 3, 6 and 7 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)). In one example, logic in the FPGA could also be implemented entirely without a microprocessor or microcontroller.

Elements of different embodiments described herein may be combined to form other embodiments not specifically set forth above. Other embodiments not specifically described herein are also within the scope of the following claims.

What is claimed is:

1. A method comprising:
   determining, by a computer device, a first schema for a particular item of content,
     the first schema being associated with a threshold level,
     the first schema specifying first resources to be used for the particular item of content, and
     the first resources including a first quantity of storage devices for storing data associated with the particular item of content;
   determining, by the computer device, a demand level for the particular item of content;
   determining, by the computer device, that the demand level is less than the threshold level;
   marking, by the computer device, the particular item of content as a down provisioning candidate based on determining that the demand level is less than the threshold level;
   determining, by the computer device and after marking the particular item of content as the down provisioning candidate, a ranking for the particular item of content and one or more other items of content that are marked as down provisioning candidates;
   selecting, by the computer device, the particular item of content based on the ranking; and
   providing, by the computer device, the particular item of content by using second resources specified by a second schema based on selecting the particular item of content,
     the second resources including a second quantity of storage devices for storing the data associated with the particular item of content, and
     the second quantity of storage devices being less than the first quantity of storage devices.

2. The method of claim 1,
   where determining the first schema for the particular item of content includes:
     determining the first schema for the particular item of content based on at least two attributes, and
   where the at least two attributes include two or more of:
     an integrity that is required for the particular item of content,
     geographical information associated with consumers that request or view the particular item of content, or
     power consumption associated with the particular item of content.

3. The method of claim 2, where the at least two attributes further include one or more of:
   a resiliency that is required for the particular item of content, or
   a popularity of the particular item of content that indicates a frequency with which the particular item of content is viewed.

4. The method of claim 1, where the first resources further include a maximum bandwidth that is used to provide the particular item of content.

5. The method of claim 1, where determining the demand level includes:
   forming a statistical representation of actual usage of the particular item of content by using at least one set of usage data, and
   determining the demand level based on the statistical representation.

6. The method of claim 1,
   where providing the particular item of content includes:
     providing the particular item of content from a group of access server platforms, and
   where at least one of the access server platforms stores the particular item of content.

7. The method of claim 6, where providing the particular item of content from the group of the access server platforms includes:
   receiving, by a first platform of the access server platforms, a request to provide the particular item of content,
   transferring the particular item of content from a second platform, of the access server platforms, to the first platform, and
   providing the particular item of content from the first platform.

8. The method of claim 1, further comprising:
   generating a model based on the data associated with the particular item of content and one or more other items of content; and
   defining the first schema and the second schema based on the model.

9. The method of claim 8, where the data includes at least one of:
- geographical information associated with viewers of the particular item of content and the one or more other items of content, or
- a statistical usage distribution characterizing numbers of views of the particular item of content and the one or more other items of content over a period of time.

10. The method of claim 1 where the first schema further specifies one or more of:
- a disk region of one or more storage devices that is used to store the particular item of content, or
- number of copies of the particular item of content that are stored.

11. A system comprising:
one or more processors to:
- determine a first schema for a particular item of content,
    - the first schema being associated with a threshold level,
    - the first schema specifying first resources to be used for the particular item of content, and
    - the first resources including a first quantity of storage devices for storing data associated with the particular item of content;
- determine a demand level for the particular item of content;
- determine that the demand level is less than the threshold level;
- mark the particular item of content as a down provisioning candidate after determining that the demand level is less than the threshold level;
- determine, after marking the particular item of content as the down provisioning candidate, a ranking for the particular item of content and one or more other items of content that are marked as down provisioning candidates;
- select the particular item of content based on the ranking; and
- provide the particular item of content by using second resources specified by a second schema based on selecting the particular item of content,
    - the second resources including a second quantity of storage devices for storing the data associated with the particular item of content, and
    - the second quantity of storage devices being less than the first quantity of storage devices.

12. The system of claim 11, where the first resources further include a maximum bandwidth that is used to provide the particular item of content.

13. The system of claim 11, where, when determining the demand level, the one or more processors are to:
- form a statistical representation of actual usage of the particular item of content by using at least one set of usage data, and
- determine the demand level based on the statistical representation.

14. The system of claim 11, where, when providing the particular item of content, the one or more processors are to:
- receive a request for the particular item of content,
- transmit the request for the particular item of content from a first server platform, of a set of platforms, to a second server platform of the set of platforms,
- transmit, to service the request, the particular item of content from the second server platform to the first server platform, and
- provide the particular item of content from the first server platform.

15. The system of claim 11,
where, when determining the first schema for the particular item of content, the one or more processors are to:
- determine the first schema for the particular item of content based on at least two attributes that are used to define the first schema, and where the at least two attributes are associated with:
- popularity levels of items of content that associated with the first schema, and
- a resiliency that is required for the items of content.

16. The system of claim 11, where the first schema further specifies one or more of:
- a particular disk region of disks that is used to store the particular item of content, or
- a particular quantity of copies of the particular item of content that are stored.

17. A non-transitory computer-readable storage medium storing instructions, the instructions comprising:
one or more instructions that, when executed by at least one processor, cause at least one processor to:
- determine a first schema for a particular item of content of one or more items of content,
    - the first schema being associated with a threshold level and information identifying first resources, and
    - the first resources including a first quantity of storage devices for storing data associated with the particular item of content;
- determine a demand level for the particular item of content;
- determine that the demand level is less than the threshold level;
- mark the particular item of content as a down provisioning candidate after determining that the demand level is less than the threshold level;
- determine, after marking the particular item of content as the down provisioning candidate, a ranking for the particular item of content and one or more other items of content that are marked as down provisioning candidates;
- select the particular item of content based on the ranking; and
- provide the particular item of content by using second resources specified by a second schema based on selecting the particular item of content,
    - the second resources including a second quantity of storage devices for storing the data associated with the particular item of content, and
    - the second quantity of storage devices being less than the first quantity of storage devices.

18. The non-transitory computer-readable storage medium of claim 17, where the instructions further comprise:
one or more instructions that, when executed by the at least one processor, cause at least one processor to:
- define the first schema based on at least two attributes associated with the one or more items of content; and
- define the second schema based on the at least two attributes.

19. The non-transitory computer-readable storage medium of claim 17, where the one or more instructions to determine the demand level include:
one or more instructions that, when executed by the at least one processor, cause at least one processor to:
- determine an average use of the particular item of content over a particular period of time, and
- determine the demand level based on the average use.

20. The non-transitory computer-readable storage medium of claim 17, where the one or more instructions to determine that the demand level is less than the threshold level include:
one or more instructions that, when executed by the at least one processor, cause at least one processor to:
determine a percentage of times when the demand level for the particular item of content is less than the threshold level, and
determine that the percentage of times is greater than a threshold percentage.

21. The non-transitory computer-readable storage medium of claim 17, where the one or more instructions to provide the particular item of content by using the second resources include:
one or more instructions that, when executed by the at least one processor, cause at least one processor to:
determine that the second resources are sufficient to provide the particular item of content if the particular item of content is associated with the second schema, down provision, based on the marking of the particular item of content, the particular item of content from being associated with the first schema to being associated with the second schema after determining that the second resources are sufficient, and
provide the particular item of content by using the second resources based on the particular item of content being associated with the second schema.

22. The non-transitory computer-readable storage medium of claim 17, where the instructions further comprise:
one or more instructions that, when executed by the at least one processor, cause at least one processor to:
determine, after marking the particular item of content as the down provisioning candidate and before providing the particular item of content by using the second resources, that the second resources specified by the second schema are sufficient to down provision the particular item of content.

* * * * *